United States Patent [19]

Mekata

[11] Patent Number: 4,984,156
[45] Date of Patent: Jan. 8, 1991

[54] AUTOMATIC CHECKIN APPARATUS

[75] Inventor: Yoshikazu Mekata, Kusatsu, Japan

[73] Assignee: Omron Tateisi Electronics Co., Kyoto, Japan

[21] Appl. No.: 127,376

[22] Filed: Dec. 2, 1987

[30] Foreign Application Priority Data

Dec. 5, 1986 [JP] Japan .................. 61-291143

[51] Int. Cl.$^5$ .................................. G07B 11/00
[52] U.S. Cl. .................... 364/407; 156/350
[58] Field of Search ............ 364/407, 200, 900; 101/288, 93.02, 93.05; 156/350

[56] References Cited

U.S. PATENT DOCUMENTS

| 3,622,995 | 11/1971 | Dilks | 340/153 |
| 3,750,103 | 7/1973 | Angus et al. | 340/153 R |
| 4,011,811 | 3/1977 | Kodis | 101/93.11 |
| 4,057,015 | 11/1977 | Kodis | 101/93.27 |
| 4,240,862 | 12/1980 | Ishiyama | 156/350 |
| 4,247,759 | 1/1981 | Yuris et al. | 235/381 |
| 4,449,186 | 5/1984 | Kelly et al. | 364/407 |
| 4,680,081 | 7/1989 | Hamisch, Jr. | 101/288 |
| 4,711,994 | 12/1987 | Greenberg | 235/384 |

FOREIGN PATENT DOCUMENTS

| 87-1179685 | 6/1987 | European Pat. Off. |  |
| 0166485 | 10/1983 | Japan | 364/402 |
| 2000621 | 1/1979 | United Kingdom | 364/402 |

OTHER PUBLICATIONS

European Search Report, date of completion of the search 9-1-1989, Examiner Droscher.

*Primary Examiner*—Jerry Smith
*Assistant Examiner*—Kim Thanh T. Bui
*Attorney, Agent, or Firm*—Dickstein, Shapiro & Morin

[57] ABSTRACT

In an automatic checkin apparatus, an air ticket is received by an air ticket reading section; a data indicative of the number of baggages is inputted via key board; and a boarding card and baggage tags are automatically issued by a boarding card printer, a boarding card magnetic recorder and a tag printer. This apparatus can save labor necessitated for boarding procedure, improve checkin efficiency and prevent erroneous checkin due to clerk intervention.

4 Claims, 5 Drawing Sheets

AUTOMATIC CHECKIN APPARATUS

BACKGROUND OF THE INVENTION

1. Field of the Invention

The present invention relates to an automatic checkin apparatus which can receive air tickets and process a necessary boarding procedure.

2. Description of the Prior Art

The conventional checkin procedure in airports is as follows: A passenger presents an air ticket at a checkin counter and receives a boarding card in which a flight number and a seat number are written or printed. In this moment, a counter clerk enters through keys data recorded on the received air ticket into a terminal device in order to transmit the data to a host computer and receive a seat reservation.

The passenger next checks his baggage at a baggage counter and receives a half of a tag on which a destination is written or printed as an exchange ticket. That is, a baggage clerk writes necessary contents on a tag by hand and cuts off the half of the tag to hand it to the passenger. The tag is attached to the baggage via a string.

As described above, since the conventional passenger checkin and baggage check work are effected by clerks, there exist problems in that it takes much processing time and therefore the counter is crowded when the number of passengers increases. In other words, a large number of clerks should be stationed at the checkin counters. Further, there exists another problem in that errors may be produced when data are inputted via keys or written by hand.

In particular, at the baggage counter, since the work of writing data on a tag and attaching the tag to a piece of baggage is effected by hand, the efficiency is poor and thus the counter is crowded.

In addition, since the passenger must carry a number of tag stubs corresponding to the number of bags, there exists a possibility of losing them.

SUMMARY OF THE INVENTION

With these problems in mind, therefore, it is the primary object of the present invention to provide an automatic checkin apparatus which can allow passengers to checkin for themselves and can issue a boarding card and baggage tags.

To achieve the above-mentioned object, an automatic checkin apparatus of the present invention comprises; air ticket reading means for receiving an air ticket and reading data recorded thereon; baggage number input means for entering data indicative of the number of bags to be checked; boarding card issuing mean for issuing a boarding card on which data indicative of at least a flight number and a seat number are recorded on the basis of data read through said air ticket reading means and data entered through said baggage number input means; and tag issuing means for issuing baggage tags corresponding to the number of bags, on which all or a part of the data recorded on the boarding card are recorded.

In the automatic checkin apparatus of the present invention, an air ticket is received by an air ticket reading means; an input data indicative of the number of bags are received by baggage number input means; and a boarding card and baggage tags are automatically issued by boarding card issuing means and tag issuing means.

Therefore, the apparatus of the present invention can reduce the amount of labor required for boarding a procedure, improve checkin efficiency and prevent erroneous checkin due to clerk intervention.

The automatic checkin apparatus of the present invention operates as follows:

(1) The air ticket reading means reads a passenger's air ticket and allocates a seat on the basis of data.

(2) The baggage number input means reads the number of passenger's bags to be checked.

(3) The boarding card issuing means issues a boarding card and the tag issuing means issues tags corresponding to the number of bags.

Since all or a part of data recorded on a boarding card are recorded on each tag, the passenger can distinguish his bags with the tag on the basis of the data of the boarding card.

DETAILED DESCRIPTION OF THE PREFERRED EMBODIMENT

Figure 1:
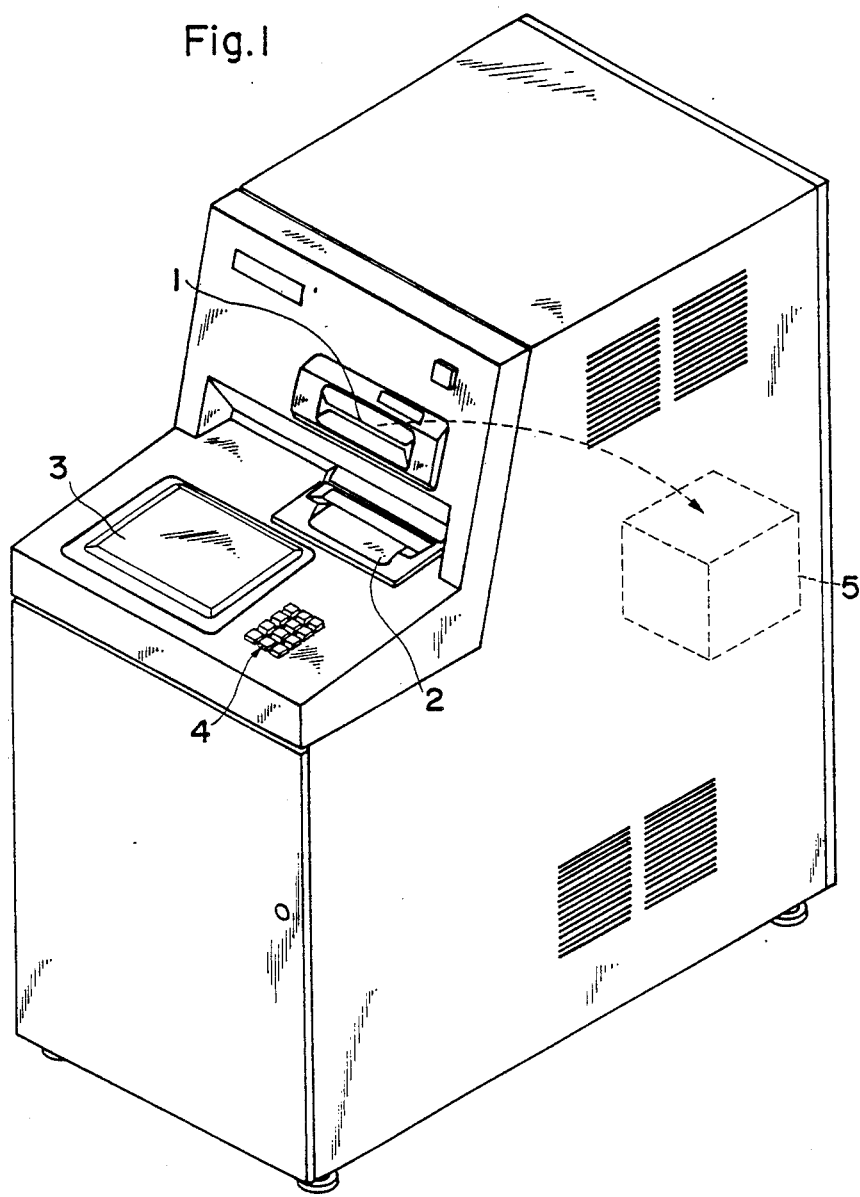
FIG. 1 is a perspective outside view showing an embodiment of an automatic checkin apparatus according to the present invention.

FIG. 1 is an outside view of an embodiment of the automatic checkin apparatus of the present invention. In FIG. 1, an air ticket insertion slot 1 is provided on a vertical operation panel so that a passenger can insert his air ticket for himself. A CRT 3 for indicating operation guidance and processed status for passengers, ten key pad 4 for entering a flight name or number and seat requirements, and an issue slot 2 for issuing a boarding card and baggage tags are arranged on a horizontal operation panel. The seat requirements are smoking seat, nosmoking seat, window-side seat, aisle-side seat, etc. These seat requirements are represented by numerical codes on the CRT 3. Therefore, the passenger can designate the seat requirements by entering a numerical code via the ten key pad 4. Further, an air ticket stocker 5 is provided inside the apparatus. A boarding card is issued on the basis of an air ticket inserted through the air ticket insertion slot 1, and then the air ticket is stocked in this air ticket stocker 5.

Figure 2:
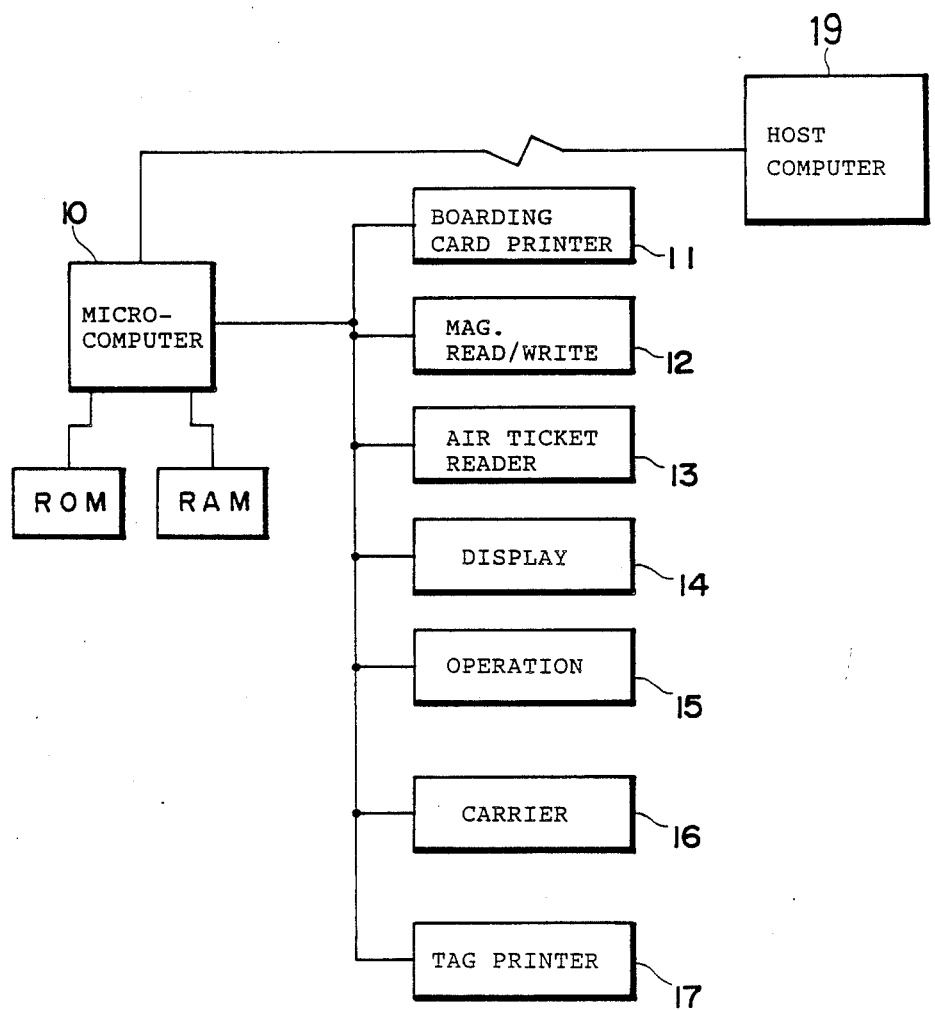
FIG. 2 is a block diagram of a controller incorporated in the automatic checkin apparatus.

FIG. 2 is a block diagram of a controller of the above automatic checkin apparatus. A microcomputer 10 for controlling the operation of the apparatus is made up of a CPU, ROM, RAM, etc. To this microcomputer 10, various sections are connected such as a boarding card printer section 11 for printing necessary contents on the surface of the boarding card by a thermoprinting method, for example; a boarding card magnetic recording (writing) section 12 for magnetically recording necessary contents on a magnetic film formed on the reverse side of the boarding card; an air ticket reader section 13 for reading contents recorded on an air ticket inserted through the air ticket insertion slot 1; a display section 14 for controlling the CRT 3; an operation control section 15 for controlling ten key pad 4; a carrier section 16 for carrying an air ticket and a boarding card; and a tag printer section 17 for printing tags for baggages.

Further, the microcomputer 10 is connected to a host computer 19 installed at a center via an exclusive line. In this host computer 19, a seat table and passengers' names are stored, respectively for each flight.

Figure 3A:
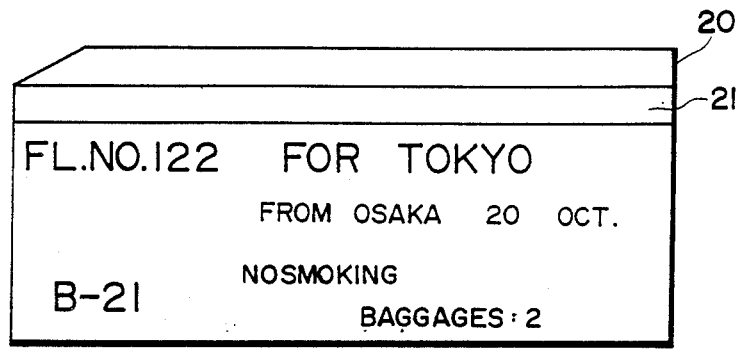
FIG. 3a is an illustration showing a boarding card issued by the automatic checkin apparatus.
Figure 3B:
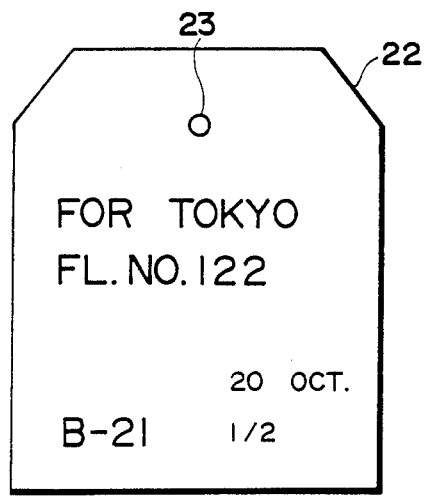
FIG. 3b is an illustration showing a baggage tag issued by the automatic checkin apparatus.

FIGS. 3a and 3b show a boarding card and a baggage tag issued by the automatic checkin apparatus, respectively. In FIG. 3a, a magnetic stripe 21 is formed on the surface of a boarding card 20, on which boarding card data such as date, flight No., seat No., destination, passenger's name, etc. are magnetically recorded. Further, only necessary data (e.g. flight No., seat No., etc.) among the boarding card data and tag No. and the number of bags are printed on the surface of the boarding card 20 by the printer section 11. Further, in FIG. 3b, a hole 23 through which a string is to be passed is formed for the tag 22, on which destination, flight No., seat No., tag No., the number of bags are printed. Therefore, a passenger can check the tag with the boarding card on the basis of flight No. and seat No. or tag No.. A string can be passed through the hole 23 automatically when a tag is issued or by the passenger himself. In the latter case, strings are prepared near the automatic checkin apparatus.

Figure 4A:
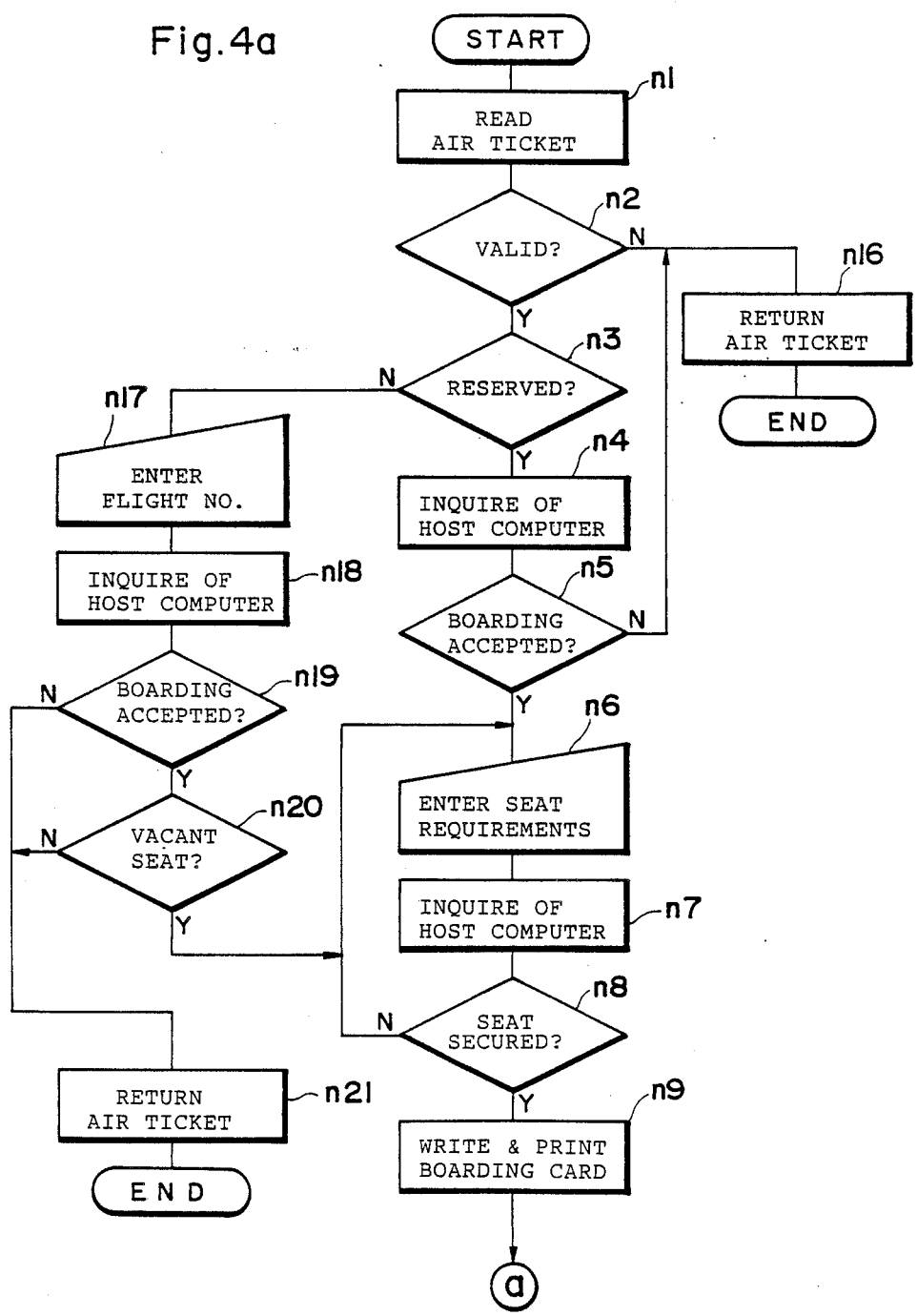
FIGS. 4a and 4b are flowcharts showing the operations of the controller incorporated in the automatic checkin apparatus.
Figure 4B:
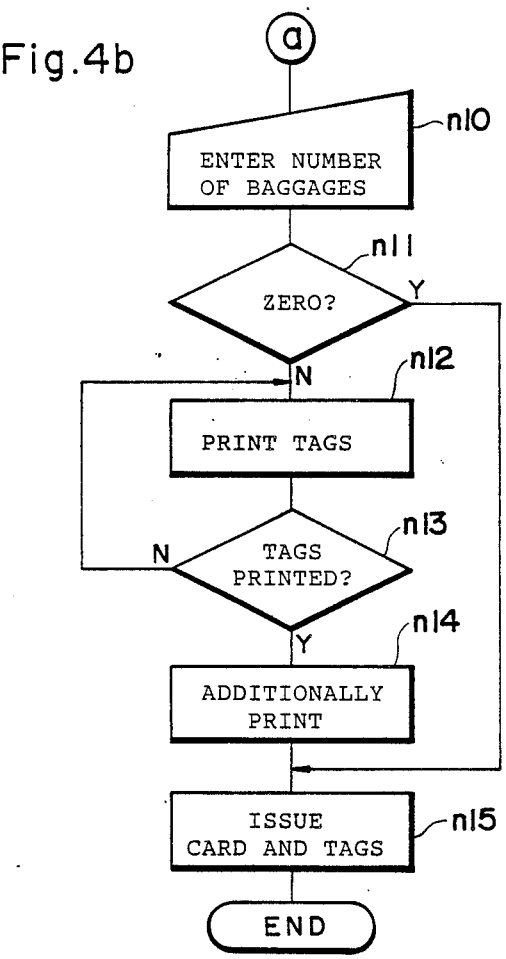

FIGS. 4a and 4b are flowcharts showing the operation of the automatic checkin apparatus of the present invention.

When an air ticket is inserted by a passenger, the contents of the air ticket are read (in step n1), and control checks whether the air ticket is valid with respect to flight route, etc. on the basis of the read contents (in step n2). If the air ticket is valid, control proceeds to step n3 to check whether the ticket is a reservation ticket by which a flight number is reserved.

If reserved, control inquires of the host computer 19 about the reserved flight number (in step n4). If the host computer 19 answers boarding acceptance, control receives seat requirements (smoking seat, nosmoking seat, etc.) entered when the passenger operates the ten key pad 4 (in step n6). Control inquires again of the host computer 19 about seats on the basis of the entered requirements (in step n7). If a seat is secured on the basis of the requirements, control proceeds to the operations of step n9 and following steps thereafter. If a seat is not secured on the basis of the requirements, control returns to step n6 again on the basis of the decision of step n8 to receive another seat requirement entry.

If the inserted air ticket is not reserved and decided so (in step n3), control proceeds to step n17 to receive a flight number entered via the ten key pad 4. Control inquires of the host computer 19 about the entered flight number (in step n18). If boarding is accepted (in step n19) and there exists a vacant seat (in step n20), control receives seat requirements (in step 6).

On the other hand, in step n9, control operates the boarding card printer 11 to print a flight number etc. on the boarding card and the boarding card magnetic recorder 12 to magnetically record a seat number etc. on the boarding card. Thereafter, control receives a data indicative of the number of bags entered via the ten key pad 4 (in step n10). Control discriminates the entered number (in step n11). If zero (this indicates no baggage), control proceeds directly to the step n15. If some bags are present, tags are printed (in step n12) and tags corresponding to the entered number are issued (in step n13). Control additionally prints the number of bags etc. on the boarding card (in step n14), proceeding to the step n15 to issue a boarding card and tags through the issue slot 2 and stock the inserted air ticket into the air ticket stocker 5. The passenger passes a string prepared near the apparatus through the hole 23 of the issued tag 22 and attaches the tag to his baggage. The bags with a tag are directly checked and deposited at a baggage counter.

Further, if the ticket is determined invalid (in step n2), if boarding is not accepted in the corresponding flight number (in steps n5 and n19), and if no vacant seat is present (in step n20), the inserted air ticket is returned to the passenger (in steps n16 and n21) to complete the operation.

The air ticket reading section 13 and the step n1 correspond to air ticket reading means; the ten key pad 4, the operation control section 15 and the step n10 correspond to baggage number input means; the boarding card printing section 11, the boarding card magnetic recording section 12 and steps n9, n14 and n15 correspond to a boarding ticket issuing means; and the a tag printer section 17 and steps n12, n13 and n15 correspond to tag issuing means.

As described above, in the automatic checkin apparatus according to the present invention, when a passenger inserts an air ticket into the apparatus and operates some keys, it is possible to automatically issue a boarding ticket and baggage tags, thus realizing an unmanned checkin counter. Therefore, checkin work (tag issuing work at a baggage counter in particular) can be labor-saved and effected speedily, thus contributing to reduction of passenger crowding and improvement in service. Further, since data on the air ticket can be directly read without intervention of clerks, it is possible to eliminate erroneous data entry. Furthermore, when a passenger has a plurality of bags, since the passenger can check tags attached to bags with data recorded on the boarding card, it is unnecessary to alway carry a stub of the tag and there exists no problem due to loss of the tag stub.

What is claimed is:

1. A method of automatically checking-in passengers which comprise the steps of:
   (a) reading data recorded on an air ticket;
   (b) checking whether the read air ticket is valid;
   (c) if the air ticket is valid, checking whether the air ticket is a reserved ticket;
   (d) if the air ticket is a reserved ticket, inquiring of a host computer if boarding is accepted;
   (e) if boarding is accepted, entering seat requirements;
   (f) inquiring of the host computer about the entered seat requirements to secure a seat under the entered seat requirements;
   (g) if a seat is secured, printing and recording at least one item of flight data on a boarding card;
   (h) reading data entered at a baggage number input means indicative of the number of bags to be checked;
   (i) if the number of bags to be checked is not zero, printing a number of tags corresponding in number to the entered data indicative of the number of bags to be checked; and
   (j) issuing a boarding ticket and said printed tags and stocking the air ticket.

2. The method of claim 1, which further comprises the steps of:
- (k) if a ticket is not a reserved ticket in step (c), entering a flight number;
- (l) inquiring of the host computer if boarding is accepted;
- (m) if boarding is accepted, checking whether a vacant seat exists; and
- (n) if a vacant seat exists, returning to step (e).

3. The method of claim 1, wherein, in step (g), said at least one item of flight data includes a flight number, a seat number and baggage tag number.

4. The method of claim 1 wherein, in step (i), each baggage tag is printed with at least a part of the information which is printed and recorded on said boarding card.

* * * * *